(12) United States Patent
Stafford (10) Patent No.: US 9,019,405 B2
(45) Date of Patent: Apr. 28, 2015

(54) METHOD AND APPARATUS FOR WAVELENGTH SPECIFIC CORRECTION OF DISTORTION IN DIGITAL IMAGES

(71) Applicant: STMicroelectronics, Inc., Coppell, TX (US)

(72) Inventor: Francis C. Stafford, Meridian, ID (US)

(73) Assignee: STMicroelectronics, Inc., Coppell, TX (US)

( * ) Notice: Subject to any disclaimer, the term of this patent is extended or adjusted under 35 U.S.C. 154(b) by 43 days.

(21) Appl. No.: 13/898,954

(22) Filed: May 21, 2013

(65) Prior Publication Data

US 2014/0347502 A1    Nov. 27, 2014

(51) Int. Cl.
*H04N 5/217* (2011.01)
*H04N 9/07* (2006.01)
*H04N 9/04* (2006.01)
*H04N 1/195* (2006.01)

(52) U.S. Cl.
CPC ............... *H04N 9/045* (2013.01); *H04N 1/195* (2013.01)

(58) Field of Classification Search
None
See application file for complete search history.

(56) References Cited

U.S. PATENT DOCUMENTS

| | | | |
|---|---|---|---|
| 2004/0141157 A1* | 7/2004 | Ramachandran et al. | 353/70 |
| 2006/0033815 A1* | 2/2006 | Tojo et al. | 348/207.1 |
| 2009/0103784 A1* | 4/2009 | Forutanpour | 382/117 |
| 2010/0091031 A1* | 4/2010 | Tsujimoto | 345/589 |
| 2010/0091143 A1* | 4/2010 | Hara | 348/241 |
| 2011/0280479 A1* | 11/2011 | Yamada et al. | 382/167 |
| 2013/0038761 A1* | 2/2013 | Tanaka et al. | 348/242 |
| 2013/0163817 A1* | 6/2013 | Porter et al. | 382/103 |
| 2014/0022657 A1* | 1/2014 | Lu et al. | 359/827 |
| 2014/0160326 A1* | 6/2014 | Black | 348/262 |

OTHER PUBLICATIONS

Ball, S., DeepFocus, http://www.dipteristsforum.org.uk/deepfocus/DeepFocus.pdf, Dec. 21, 2004.
Kimo Kim; In-Cheol Park, "Combined image signal processing for CMOS image sensors," Circuits and Systems, 2006. ISCAS 2006. Proceedings. 2006 IEEE International Symposium on , vol., no., pp. 4 pp.,, May 21-24, 2006.

\* cited by examiner

*Primary Examiner* — Lin Ye
*Assistant Examiner* — Euel Cowan
(74) *Attorney, Agent, or Firm* — Gardere Wynne Sewell LLP (57) ABSTRACT

A method and apparatus for digital image correction in which a plurality of received color component arrays received from a digital camera are each corrected for distortion dependent upon the color associated with the array. Other corrections may also be applied, such as for sensitivity non-uniformity in the sensing array or illumination non-uniformity. The corrected color component arrays for each of the plurality of color components are combined to form a corrected digital image. The method and apparatus may be integrated with digital cameras in a variety of applications including, but not limited to, digital document imaging.

19 Claims, 9 Drawing Sheets

METHOD AND APPARATUS FOR WAVELENGTH SPECIFIC CORRECTION OF DISTORTION IN DIGITAL IMAGES

CROSS-REFERENCE TO RELATED APPLICATIONS

This application is related to co-pending U.S. patent application Ser. No. 13/898,889, filed on even date herewith, which is hereby incorporated herein in its entirety.

BACKGROUND

The advent of digital imaging stimulated the development of Image Signal Processing (ISP) techniques to produce images that rival the quality and cost of (analog) film photography. The conventional ISP pipeline performs the basic functions: (i) correction of image capture artifacts; (ii) color image formation; (iii) image quality improvement; and (iv) image compression. The correction for radial distortion in conventional ISP pipeline, if included, is performed as one of the image quality improvement functions after color image formation.

Distortion correction is becoming increasingly more important: (i) Imaging applications demanding wider fields of view (e.g., short focal length document imaging), which drives increased distortion in cheap lens assemblies; and (ii) image sensor cost reduction pressures are driving smaller image sensor pixel sizes.

One limitation of the conventional ISP approach is that the same distortion correction is applied to all image pixel color components, even though radial distortion, for example, is proportional to wavelength.

BRIEF DESCRIPTION OF THE FIGURES

The accompanying figures, in which like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to the generation and correction of digital images. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may comprise one or more conventional processors and unique stored program instructions that control the one or more processors to implement, in conjunction with certain non-processor circuits, some, most, or all of the functions of digital image creation described herein. The non-processor circuits may include, but are not limited to signal drivers, clock circuits, power source circuits, memory components, mechanical components, optical components and user input devices. As such, these functions may be interpreted as a method to create digital images. Alternatively, some or all image processing functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present disclosure relates to a method and apparatus for wavelength specific correction of distortion in a digital image. In contrast, prior image signal processing systems apply the same distortion correction to all image pixel color components.

Figure 1:
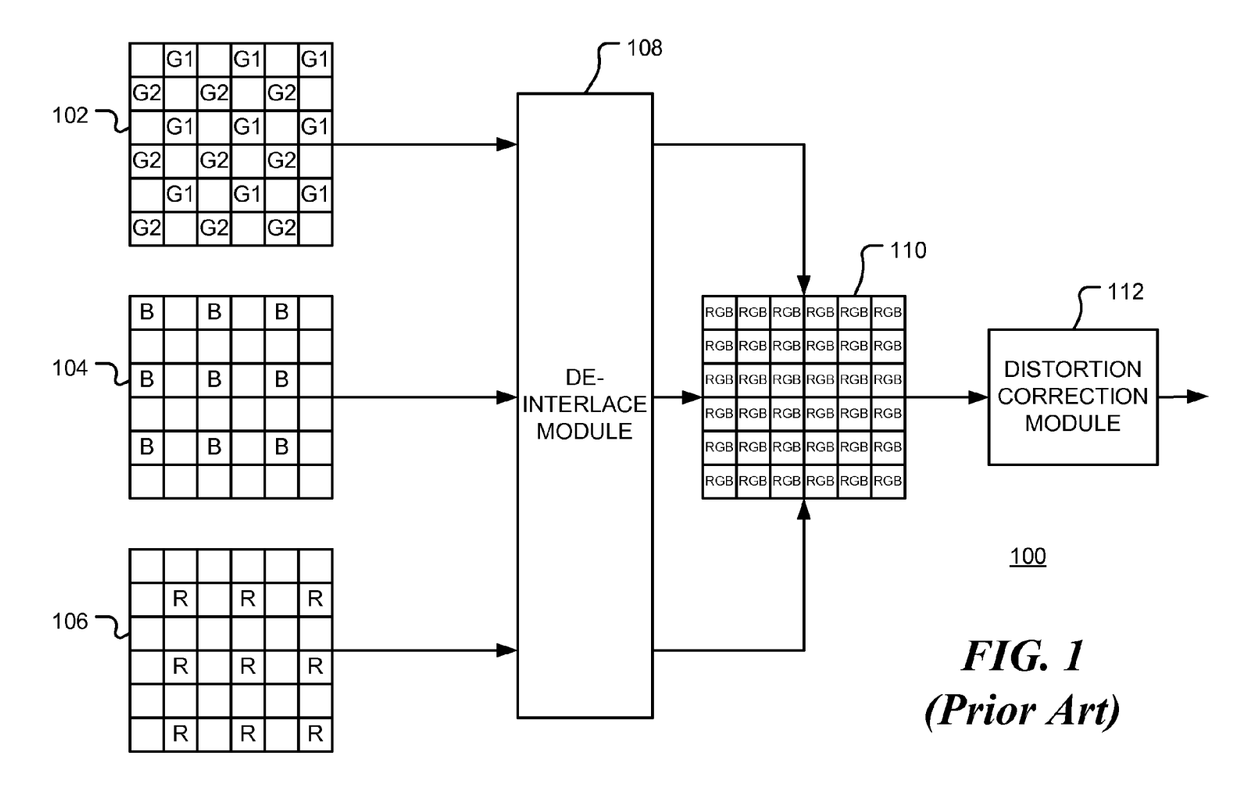
FIG. 1 is a block diagram of an image signal processing architecture.

FIG. 1 is a block diagram of an image signal processing architecture 100 of the prior art. Digital color cameras commonly use a pixel sensor array positioned behind a color filter array (CFA) or color filter mosaic (CFM). The color filters in the CFA limit the range of wavelengths of the light reaching each of the luminance sensitive pixel sensors in the sensor array. In this example, a Bayer filter mosaic is shown, consisting of repeated groups of four filters, each group having two green filters, one red filter and one blue filter. The outputs from the pixel sensor array elements behind the green filters are shown as 102, the outputs from behind the blue filters are shown as 104 and the outputs from behind the red filters are shown as 106. Thus, the red, green and blue outputs are interlaced in the pixel sensor array. The red green and blue outputs pass though a de-interlace module 108 that interpolates between the measured pixels to form the color image 110. The color image may then be processed in distortion correction module 112 to correct for lens distortion or illumination non-uniformity. Optionally, pixel data may be corrected in a Pixel Data Correction module. Pixel data correction may include the steps: (1) "Dark Field Subtraction" (removal of noise due to pixel leakages); (2) "Hot Pixel Interpolation" (creation of data for 'hot' pixels); and (3) "Flat Field Division" (correction illumination non-uniformities and pixel response non-uniformities).

Figure 2:
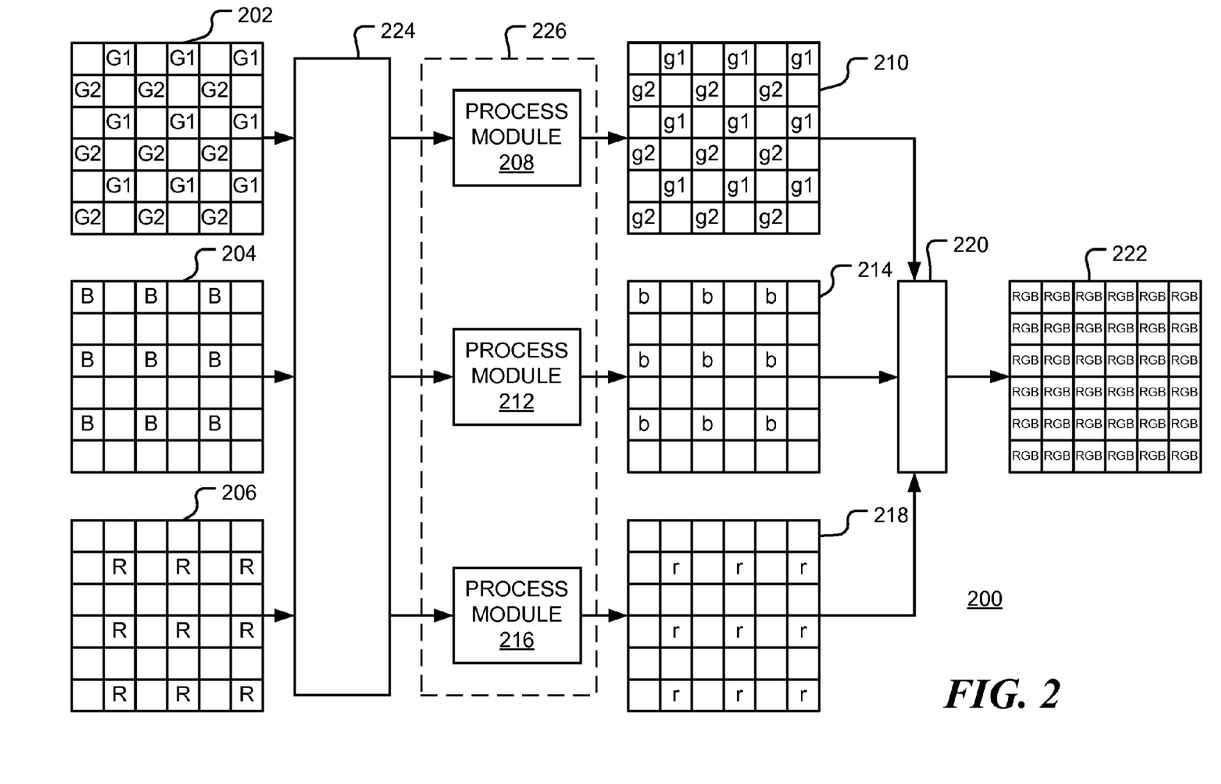
FIG. 2 is a block diagram of an image signal processing architecture for correcting digital images in accordance with some embodiments of the invention.

FIG. 2 is a block diagram of an image signal processing architecture 200 in accordance with some embodiments of the disclosure. In the example shown in FIG. 2, it is assumed that a digital camera having a Bayer filter mosaic over an array of luminance sensitive pixel sensors was used to capture the raw image. The Bayer mosaic consists of repeated groups of four filters, each group having two green filters, one red filter and one blue filter. However, other filter mosaics may be used, possibly including different colors or clear filters. The color filters in the Bayer filter mosaic limit the range of wavelengths of the light reaching each of the luminance sensitive pixel sensors in the pixel sensor array. The outputs from the pixel sensor array elements receiving green light are shown as color component array 202, the outputs from elements receiving blue light are shown as color component array 204 and the outputs from elements receiving red light are shown as color component array 206. In each color component array, the sensed pixels are designated by the first letter of the sensed color. For example, in 202, the 'G' denotes pixels that were illuminated with green lights and the blank pixels denote pixel for which green light was blocked. For simplicity, only 36 pixels are shown in the figures. In practice the array may comprise several million or tens of millions of pixels. When a color component array has one or more blank array elements or pixels, as in the example shown in FIG. 2, the array is termed 'incomplete'. In FIG. 2, each group of four pixels may be used to construct a single pixel in the final image. Alternatively, the blank pixel values may be determined by interpolation of de-interlacing.

The color component arrays may be obtained by other means, such as using different illumination colors, or dichroic mirrors. In the case of different illumination colors, the color component arrays may be complete.

The green array 202 is processed by processing module 208 to produce a corrected green array 210, the blue array 204 is processed by processing module 212 to produce corrected blue array 214 and the red array 206 is processed by processing module 216 to produce corrected red array 218. Each processing module (208, 212 and 216) may include elements for distortion correction and illumination non-uniformity correction, which are wavelength dependent, and pixel sensing element sensitivity correction, which is sensing element dependent. Additional processing modules may be used if additional colors are sensed.

The corrected outputs in corrected color component arrays 210, 214 and 218 are passed through de-interlace module 220 to produce the final color image 222. The de-interlace module interpolates each color from the sensed pixels to the blocked pixels so that the final color image has the same pixel resolution as the sensing array.

The final color image may be further processed to enhance image quality by performing color balance, anti-aliasing or sharpening for example, for image modification such as scaling, rotation, or for image compression.

The processing modules 208, 212, and 216, and the de-interlace module may be implemented on a common processor, such as a programmed processor, an FPGA, a custom circuit or other means known to those of ordinary skill in the art.

Camera lenses are generally dispersive, which means that the lens's refractive index (its ability to bend light) is wavelength dependent. As a result, the distortion of an image is wavelength dependent. For example, longitudinal chromatic aberration is the change of the lens's point of focus for different wavelengths. Lateral chromatic aberration, or geometric distortion, is the change in a lens's magnification or distortion for different wavelengths, resulting in color fringing. In accordance with one aspect of the present disclosure, a separate distortion correction is used for each color component array.

In one embodiment of the disclosure, each pixel value in the color component arrays 202, 204 and 206 is moved to array position closest to the undistorted position.

Optionally, pixel data may be corrected in Pixel Data Correction module 224. Pixel data correction may include the steps: (1) "Dark Field Subtraction" (removal of noise due to pixel leakages); (2) "Hot Pixel Interpolation" (creation of data for 'hot' pixels); and (3) "Flat Field Division" (correction illumination non-uniformities and pixel response non-uniformities).

In prior approaches, the distortion correction is applied to the de-interlaced image and the same distortion correction is applied to each color component of the image.

Figure 3:
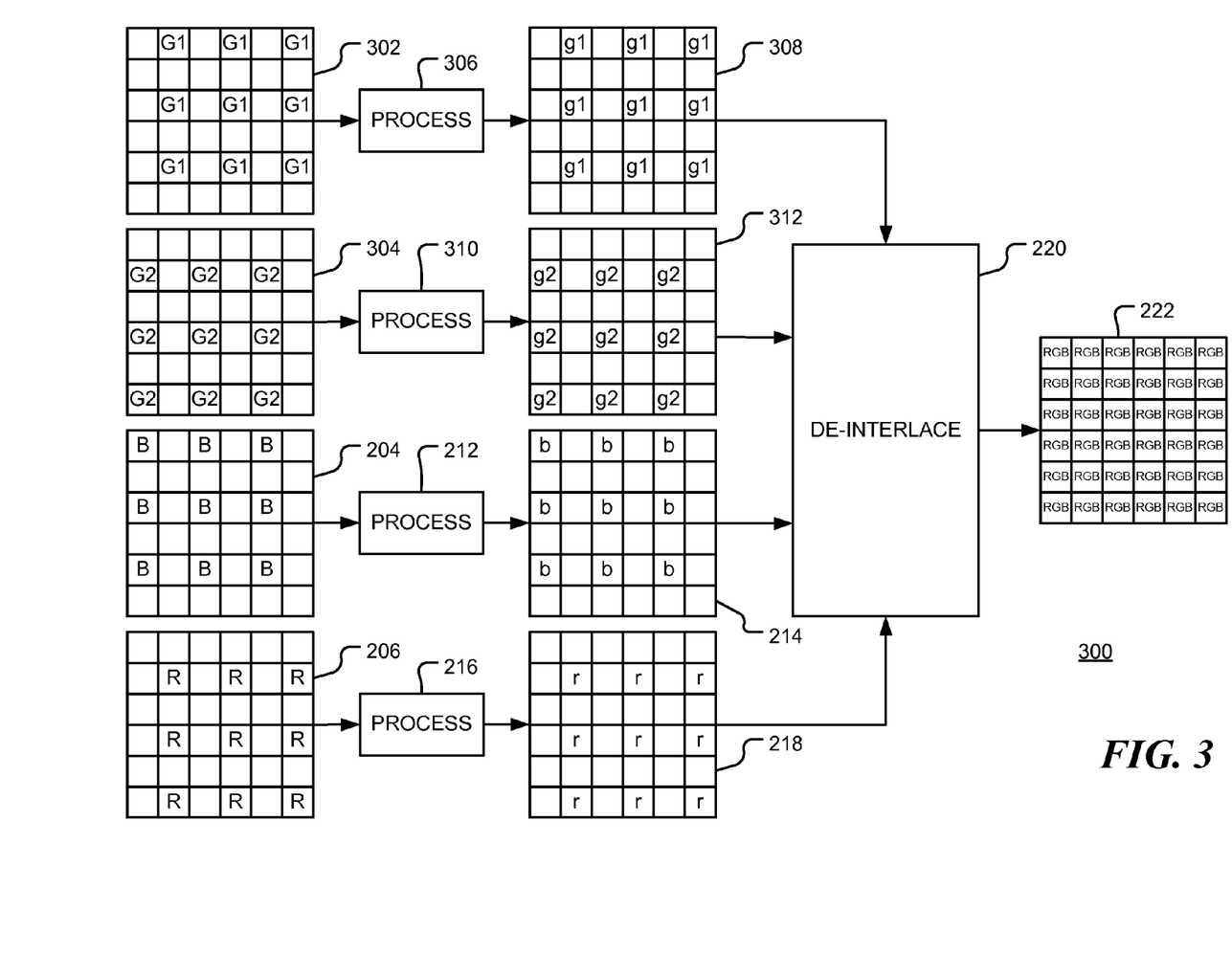
FIG. 3 is a block diagram of an image signal processing architecture in accordance with some embodiments of the invention.

FIG. 3 is a block diagram of an image signal processing architecture 300 in accordance with some embodiments of the disclosure. In the example shown in FIG. 3, a Bayer filter mosaic is again used. However, the green component array is divided into first and second arrays 302 and 304, with 'G1' denoting a first group of pixel signals and 'G2' denoting a second group. As before, the blue component array is shown as 204 and the red component array is shown as 206. The first green array 302 is processed by processor 306 to produce a first corrected green output 308. The second green array 304 is processed by processor 310 to produce a second corrected green output 312. As before, the blue array is processed by processor 212 to produce corrected blue array 214 and the red array is processed by processor 216 to produce corrected red array 218. An advantage of this approach is that the pixel pattern (one pixel in each group of four) is the same for each of the color component arrays 302, 304, 204 and 206, allowing similar processing to be applied to each array.

Figure 4:
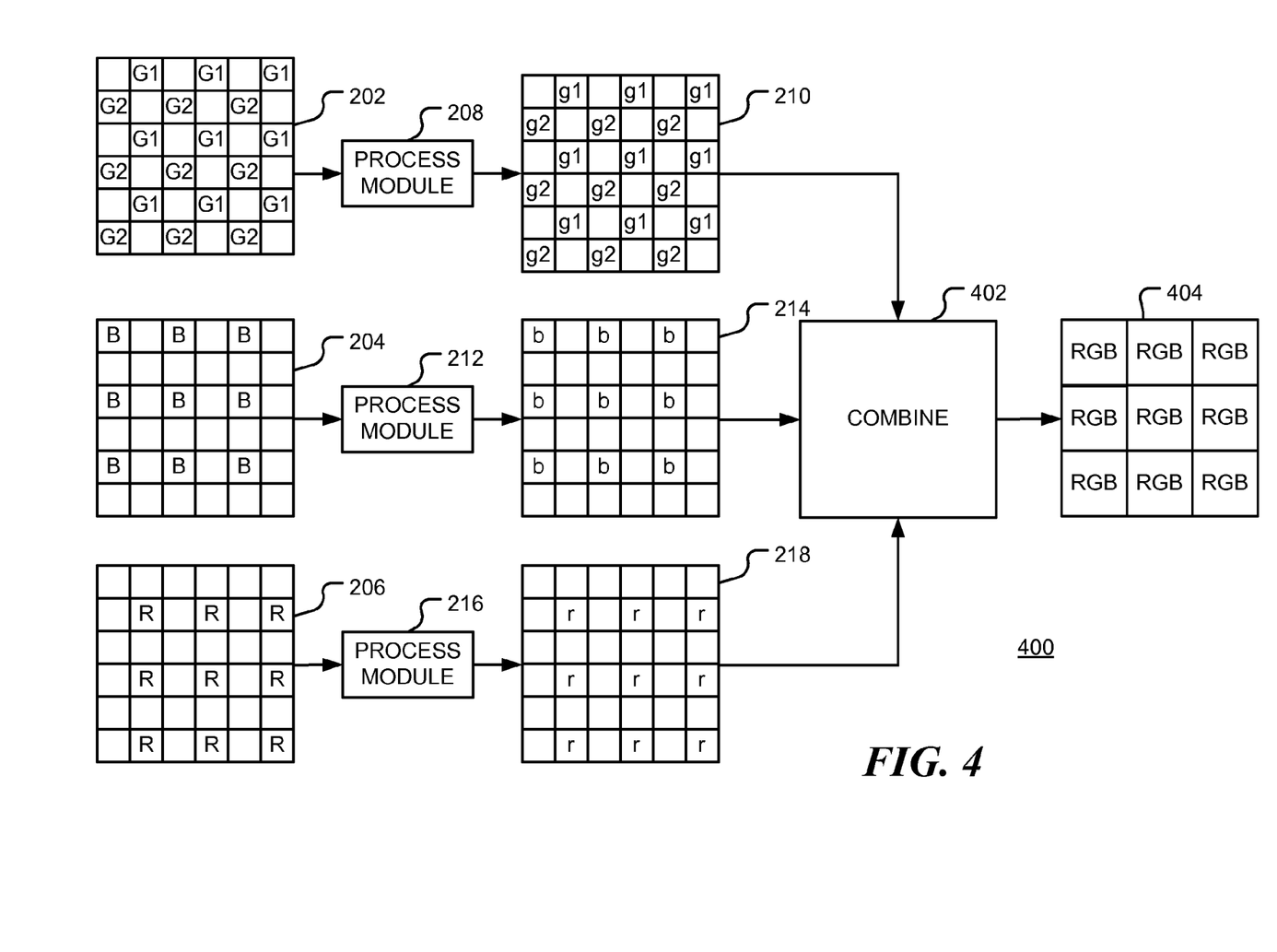
FIG. 4 is a block diagram of an image signal processing architecture in accordance with some embodiments of the invention.

FIG. 4 is a block diagram of an image signal processing architecture 400 in accordance with some embodiments of the disclosure. In this architecture, the corrected arrays 210, 214 and 218 are combined such that each 2×2 mosaic of four sensing elements results in a single pixel in the final image 404. Note that, for example, the red and blue sensors are at different locations. The distortion correction depends upon the pixel location, so applied the correction to the arrays 202, 204 and 206 is not equivalent to applying the corrections to the combined image 404. Image 404 assumes that the sensing elements are co-located.

In the approaches shown in FIGS. 2, 3 and 4, the corrected color component arrays are incomplete and are de-interlaced to obtain the final corrected image.

Figure 5:
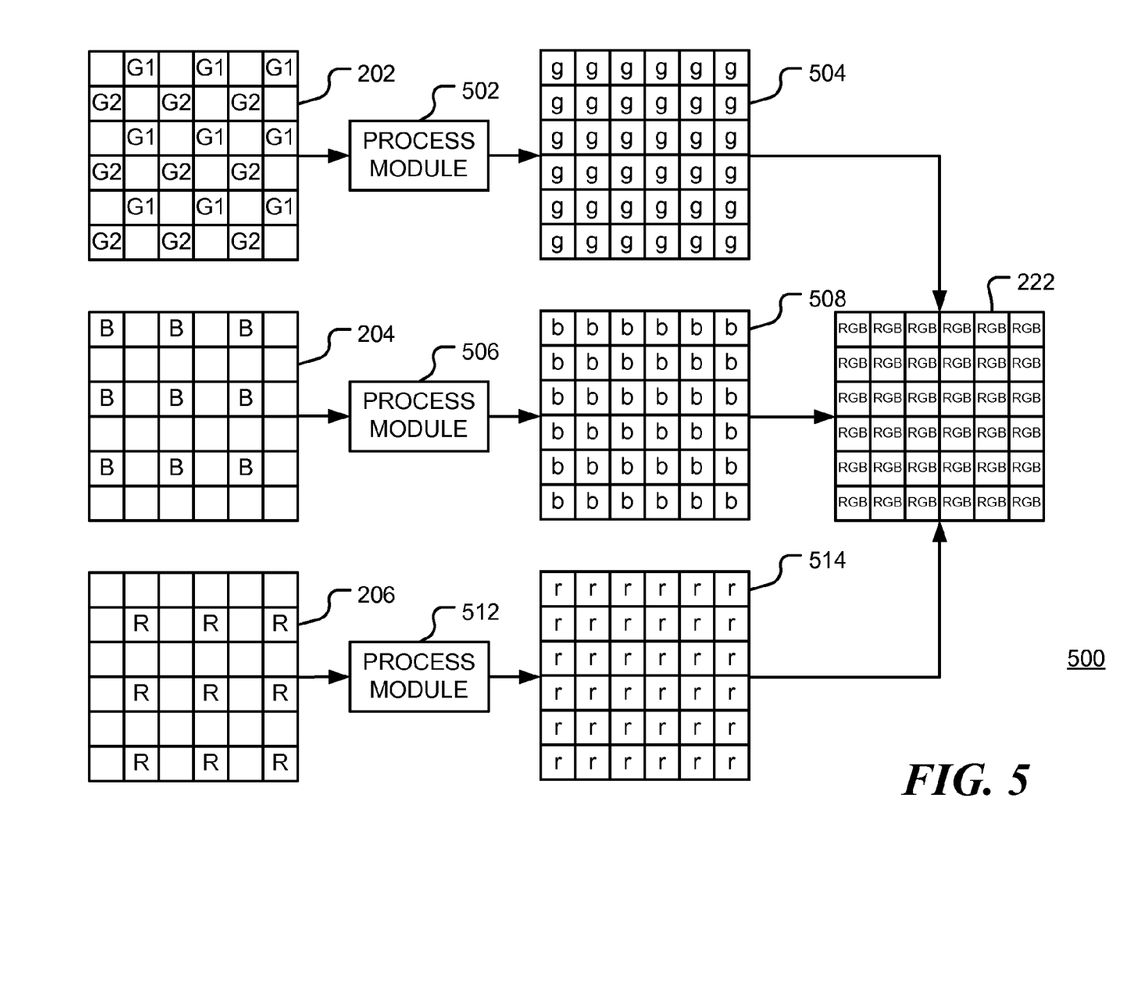
FIG. 5 is a block diagram of an image signal processing architecture in accordance with some embodiments of the invention.

FIG. 5 is a block diagram of an image signal processing architecture 500 in accordance with some embodiments of the disclosure. In this embodiment, the distortion correction is combined with the de-interlace function, so that the corrected color component arrays 504, 508 and 514 are complete. For example, processing module 502 computes a corrected, and de-interlaced, color component array 504. Each pixel value in the corrected array 504 is obtained as a weighted sum of components in the original array, the weightings being dependent upon the geometry of the camera. For a given pixel position in array 504, a corresponding position in the original array 202 may be identified from knowledge of the camera geometry. Pixel values in the neighborhood of this corresponding position may be weighted and combined to estimate the corrected pixel value. Similarly, processing modules 506 and 512 perform the functions of distortion correction and de-interlacing for the blue and red component arrays 204 and 206, respectively.

Figure 6:
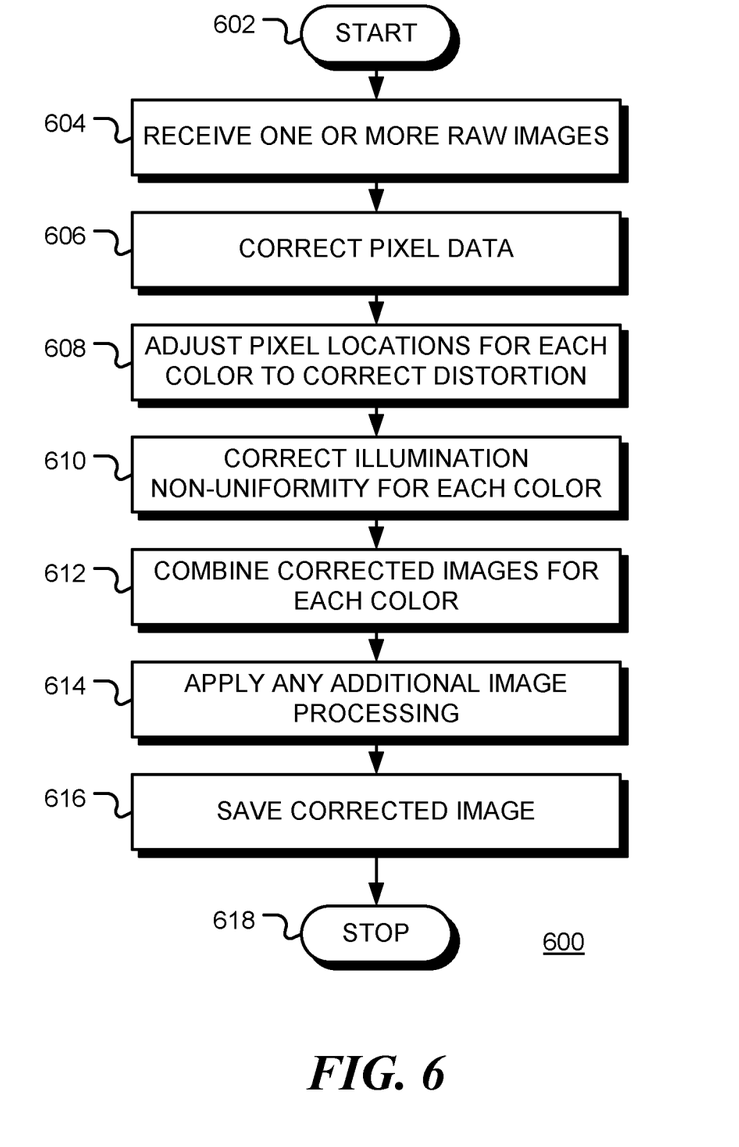
FIG. 6 is a flow chart of a method for digital imaging in accordance with some embodiments of the invention.

FIG. 6 is a flow chart 600 of a method for digital imaging in accordance with some embodiments of the disclosure. The method may be used to process images captured by a digital camera. The digital camera may be part of a document imaging system. However, the method has application to any digital image where distortion correction or illumination correction is desired. Following start block 602 in FIG. 6, one or more raw images are received at block 604. These may be stored images or images just captured by a camera. The one or more raw images may be one image for each color, or a color mosaic, and provide a plurality of color component arrays. They may be obtained using a color filter array, a sequence of different color images obtained by illuminating using different color light, or other chrominance selective means. Pixel data correction is applied at block 606. This may include (1) Dark Field Subtraction to remove noise due to pixel leakages, (2) Hot
Pixel Interpolation to create data for hot pixels and (3) Flat Field Division to correct for illumination non-uniformities and pixel response non-uniformities.

At block 608, pixel locations are adjusted for each color component array to correct for wavelength-dependent distortion. Since the refractive index of a lens is dependent upon the wavelength of the light, not all light is focused on the same point. This type of distortion is called chromatic distortion or chromatic aberration. Performing distortion correction for each of a number of wavelength ranges improves the overall quality of the image, in particular reducing the amount of 'fringing' seen at the edges of bright regions in the image. A variety of distortion correction techniques is known to those of ordinary skill in the art. For example, the technique may utilize a mathematical model of radial distortion based on camera and lens projection geometry. Other techniques correct for an estimated point spread function (PSF) by performing a de-convolution operation, in which each pixel value is replaced by a value dependent upon the original pixel value and neighboring pixel values.

Using a larger number of colors (wavelength spectra) provides a higher quality image. In particular, three or more than three colors may be used. At block 610, an illumination correction is applied to each color component array to compensate for the non-uniform illumination of the object being imaged. The non-uniformity is a function of wavelength. This effect is negligible if the non-uniformity is less than approximately 10%. However, for the case of 50% non-uniformity there is an inherent loss of 1-bit of contrast data for the weakly illuminated pixels, and it is important to avoid further contrast losses. A variety of techniques for illumination correction are known to those of ordinary skill in the art. The corrected images for each color are combined at block 612. Optionally, additional image processing is applied at block 614 and the combined image is saved, or output, at block 616. The method terminates at block 618.

The image processing architecture described above may be used in a variety of imaging applications. An exemplary application to the imaging of documents and the like is shown in FIG. 7 and FIG. 8.

Figure 7:
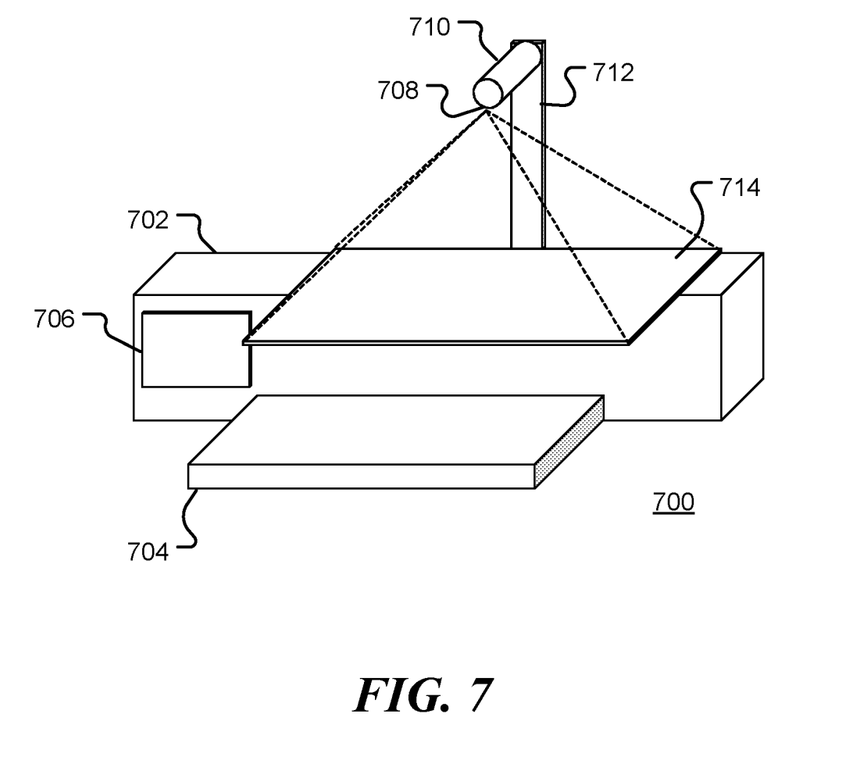
FIG. 7 is an example printer and imager in accordance with some embodiments of the invention.
Figure 8:
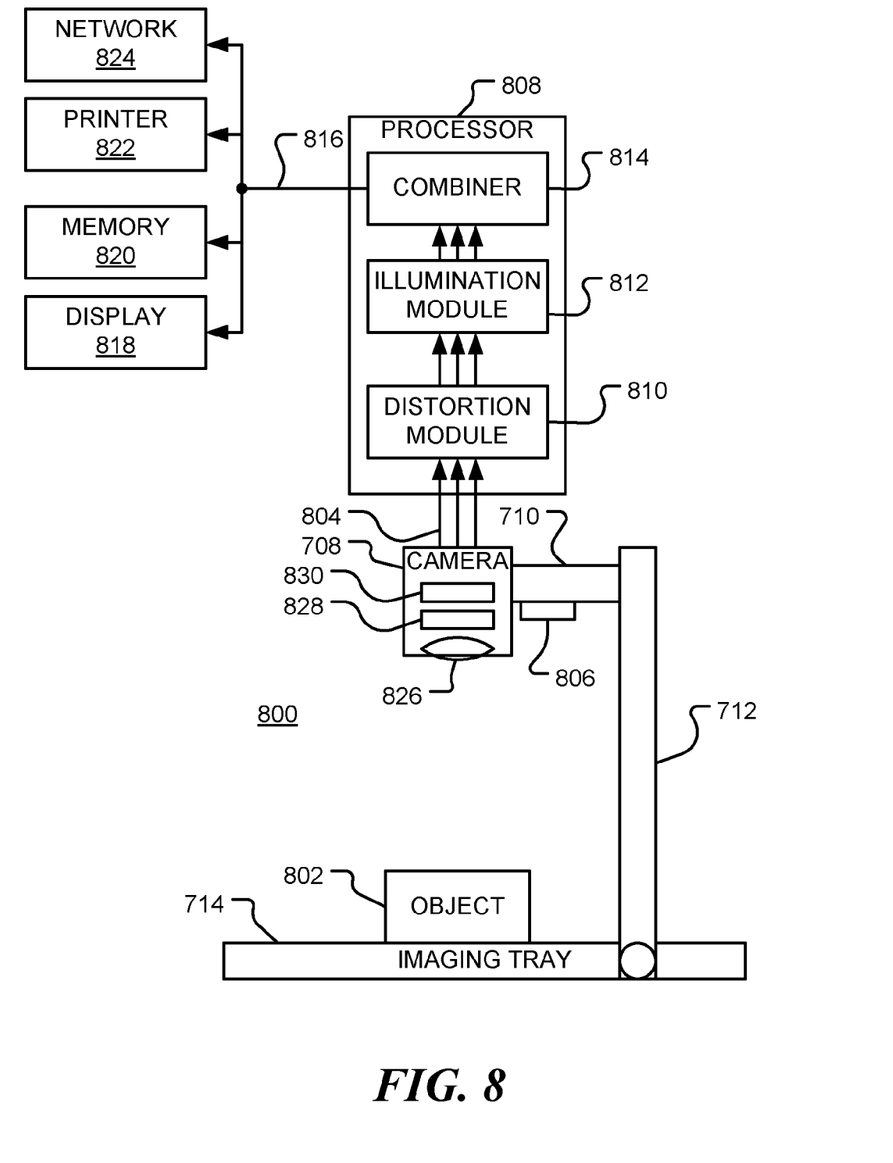
FIG. 8 is a block diagram of an exemplary apparatus for correcting a digital image of an object, in accordance with an embodiment of the invention.

FIG. 7 is an example printer and imager in accordance with some embodiments of the disclosure. The imager 700 comprises an imager body 702. In an embodiment where the imager is combined with a printer, the imager body 702 may house the printing head, ink cartridges and paper transport mechanism, a paper output tray 704 for collecting printed pages. A control panel 706, such as a touch control display, is provided to enable user control of imager and/or printer functions. The imager 700 further comprises a camera 708, such as a CMOS camera, a camera mounting arm 710, a support arm 712 and a document imaging tray 714. The camera mounting arm may also support one or more illumination sources. A processor for image correction may be housed in the imager body 702, integrated with the camera 708, or location at another location.

In one embodiment, the illumination source directs white light towards the imaging tray 714 and the camera is a color camera that includes chrominance selective components, such as a color filter array (CFA) or dichroic mirror array. For example, a Bayer filter mosaic may be used in which each pixel sensor in the camera 708 is covered by a two-by-two sub-mosaic that contains 2 green, 1 red and 1 blue filter. Other mosaics are known to those of ordinary skill in the art.

In a further embodiment, the illumination source illuminates an object to be imaged by a sequence of different colored light in a sequence. The sequence may be red, green, blue, for example. In this embodiment, a monochrome camera may be used.

A combination of these approaches may be used.

The camera may be a CMOS camera, for example. The camera may have a fixed focal length for application where low cost is required. Alternatively, the camera may have a variable focal length to improve image quality. Suitable cameras are manufactured in very large quantities for use in portable electronic devices, such as mobile telephones, and are therefore inexpensive.

For a diffraction limited lens, the numerical aperture, NA of the lens is related to the resolution R by the relation $$NA = \frac{R}{1.22\lambda},$$

where $\lambda$ is the wavelength of the light. For example, for a camera with having a 1.4 µm pixel pitch, which is typical of an 8 megapixel camera, the Numerical Aperture should be less than approximately 2.4, in order to avoid the diffraction limitation for a camera having a 1.4 µm pixel pitch that is typical of an 8 megapixel camera. However, lenses with an NA greater than approximately 2.8 are less expensive and have a greater depth of field. Further, inexpensive lenses have a curved focal field and so benefit from a greater depth of focus. Thus, there is a design compromise in the choice of lens.

In an exemplary embodiment, the support arm 712 is sized to support the camera 708 at approximately 7 inches above the imaging tray, so as to satisfy the design compromise described above. In this embodiment, the required field of view for an 8.5"×11" document is approximately 94°. This results in an image distortion of greater than 10% at the document corners. In addition, the illumination at the corners is approximately 50% of the illumination in the center, so the illumination is non-uniform.

Both the distortion and non-uniform illumination may be reduced by increasing the distance from the camera 708 to the imaging tray 714, but this is done at the expense of compactness.

The image correction techniques described above may be used to compensate for distortion and non-uniform illumination.

In the exemplary embodiment described above, the imager is integrated with a printer to enable local printing of scanned documents. However, the imager may be used as a stand-alone device or as a device integrated with other electronic or non-electronic equipment.

The benefits of camera-based imaging over conventional scanning are that it is faster, silent, and lower power.

FIG. 8 is a block diagram of an exemplary apparatus 800 for acquiring a reconstructed digital image of an object 802, in accordance with certain aspects of the disclosure. A digital camera 708 is operable to capture a plurality of color component arrays 804 corresponding to a plurality of color components of light from the object 802. The light may be ambient light or light generated by one or more illumination sources 806. An image processor 808 is operable to process the plurality of color component arrays to produce a plurality of corrected color component arrays, and includes a distortion correction module 810, an illumination correction module 812 and an image combiner 814, operable to combine the plurality of corrected color component arrays to form the corrected digital image 816.

The corrected digital image 816 may be passed to one or more of a display 818, a memory 820, a printer 822 and a network 824.

In this embodiment, the digital camera 708 comprises a lens 826 and a Color Filter Mosaic 828 that overlies an array 830 of luminance sensitive pixel sensors. Other types of cameras may be used.

Figure 9:
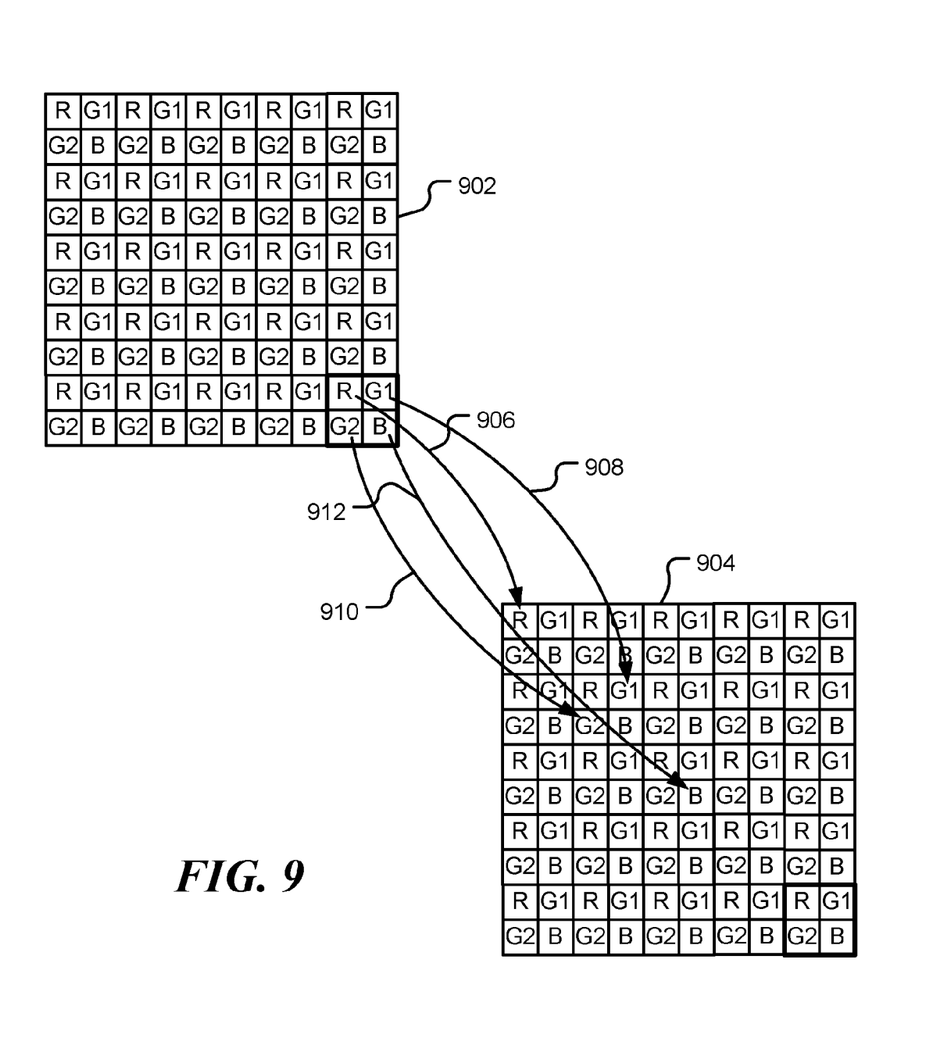
FIG. 9 is a diagram depicting wavelength-dependent distortion correction in accordance with an embodiment the invention.

FIG. 9 is a diagram depicting wavelength-dependent distortion correction in accordance with the present disclosure. Referring to FIG. 9, a color component array 902 depicts a section of an array of pixel values corresponding color components captured by a digital camera. In the example shown, the color components are denotes red (R), green (G) and blue (B), although other color components could be captured, and the components are arranged in a Bayer color pattern. An image processor applies distortion correct to each color component separately to produce a corrected array. A section of the corrected array is shown as 904. In this example, a red pixel is moved to a location in the corrected array as indicated by the arrow 906, green pixels are relocated as indicated by arrows 908 and 910 and a blue pixel is relocated as indicated by arrow 912. It should be noted that the correct array 904 is obtained by moving different color pixels by different amounts. This is required since amount of distortion is different for different colors, since the different colors correspond to different wavelengths. Both perspective and radial distortions may be corrected for. In the example shown, the pixels are relocated in a radial direction in the array to correct for radial distortion. The red pixel is moved the most, since radial distortion is proportional wavelength.

The amount of correction shown in FIG. 9 is selection for illustrative purposes. In practice, the amount of correction is dependent upon the wavelength of the light and the refractive index of the lens at that wavelength.

For example, for a fused quartz lens, the index of refraction for blue light is approximately 1% larger than that for green light, and the index of refraction for red light is about 0.5% smaller than for green light. Thus, if an imager has 10% radial distortion for green light, then blue light has 10.1% radial distortion and red light has 9.95% radial distortion.

For the case of a 12 mega-pixel image sensor, with 4000× 3000 individual pixels, the correction for 10% barrel distortion of green light along the horizontal direction corresponds to movement of the green pixel data by exactly 100 whole pixel steps (a whole pixel is composed of four individual pixels, R, G1, G2, B). The corresponding correction for the 10.1% distortion of blue pixels is a location adjustment of 101 whole pixel steps, and the correction for the 9.95% distortion of red pixels is 99.5 whole pixel steps (for example, half the red pixel data may be moved into the red pixel at 99 whole pixel steps away and the other half of the red pixel data moved into the red pixel 100 whole pixel steps away).

In prior image correct systems, the color components are combined before distortion correction is applied, so the same distortion correction is applied to every color. Each color element is moved by the same amount. In the extremes of very high radial distortion and very small image sensor pixel size, this can result in RGB/color image pixels being constructed from incorrect image sensor pixels.

In one embodiment, "dark field subtract" correction (to remove signal resulting from image sensor pixel leakages) and any pixel data interpolation (to create data for hot image sensor pixels) is applied to the raw image sensor pixel data before the wavelength specific distortion correction is applied. In addition, the image sensor pixel data may be corrected for illumination non-uniformity (and image sensor pixel response non-uniformity) via "flat field divide" prior to the wavelength specific distortion correction. These techniques are known to those of ordinary skill in the art.

Image sensor pixels may be relocated in "whole pixel steps", so that data is relocated to the nearest location of the same image sensor pixel type. For example, red moves to the nearest red location, blue to the nearest blue location, green to the nearest green location (whist retaining the correct position within the filter mosaic).

When a monochrome image sensor is used, where color image is created by combining multiple exposures with different color filters, the non-correspondence between image sensor pixel locations and color image pixels will begin to occur at half the amount of distortion as for Bayer image sensor (with same pixel dimension).

The image correction technique described herein may be implemented in software for execution on a programmed processor, such as personal computer or mobile electronic device, and used to correct digital images from raw image data. The correction technique enables improved color image quality in wide angle applications that utilize inexpensive lenses having high radial distortion. The technique also enables continued reduction of image sensor pixel size that, in turn, allows cost reduction.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. An apparatus for correcting a digital image of an object, the apparatus comprising:
    a digital camera operable to capture one or more images comprising a plurality of color component arrays that correspond to a plurality of color components of light from the object;
    an image processor, operable to process the plurality of color component arrays to produce a plurality of corrected color component arrays, and
    an image combiner, operable to combine the plurality of corrected component arrays to form the corrected digital image,
    wherein the image processor comprises at least one distortion correction module operable to adjust the locations of pixels in a color component array of the plurality of color component arrays by amounts dependent upon the wavelength of the corresponding color component and a mathematical model of distortion introduced by the digital camera to obtain a corrected color component array.

2. An apparatus in accordance with claim 1, wherein the image processor further comprises an illumination correction module for each color component array of the plurality of color component arrays, each illumination correction module operable to compensate for illumination non-uniformity in a corresponding color component of light.

3. An apparatus in accordance with claim 1, wherein the digital camera comprises an array of luminance sensitive sensors, and wherein the image processor further comprises a sensor compensation module operable to compensate for sensitivity variations among elements of the array of luminance sensitive sensors.

4. An apparatus in accordance with claim 1, wherein the digital camera includes a color filter mosaic.

5. An apparatus in accordance with claim 1, further comprising an illumination source operable to illuminate the object with at least one color component.

6. An apparatus in accordance with claim 1, further comprising:
    an imager body;
    a support arm, coupled to the imager body; and
    a camera mounting arm, coupled to the support arm and adapted to support the digital camera.

7. An apparatus in accordance with claim 6, further comprising:
    a printer substantially housed within the imager body and operable to print the corrected digital image.

8. An apparatus for correcting a digital image of an object, the apparatus comprising:
    an input operable to receive one or more images, the one or more images comprising a plurality of received color component arrays that correspond to a plurality of color components of light from the object;
    an image processor, operable to process the plurality of received color component arrays to produce a plurality of corrected color component arrays;
    an image combiner, operable to combine the plurality of corrected component images to form the corrected digital image, and
    an output for transmitting the corrected digital image,
    wherein the image processor comprises at least one distortion correction module operable to adjust the locations of pixels in a received color component array of the plurality of received color component arrays by amounts dependent upon the wavelength of the corresponding color component and a mathematical model of distortion introduced by the digital camera to obtain a corrected color component array.

9. An apparatus in accordance with claim 8, wherein the image processor further comprises at least one illumination correction module for one or more color component arrays of the plurality of color component arrays.

10. A method for correcting a digital image, the method comprising:
    receiving a plurality of received color component arrays corresponding to a plurality of color components sensed at luminance sensitive sensor array of a digital camera;
    for each color component array of the plurality of received color component arrays:
        adjusting locations of pixels in the color component array to correct for distortion of the received color component array, the location adjustments being dependent upon the color of the sensed component, at least one pixel value in the color component array, and a mathematical model of distortion introduced by the camera, to obtain a corrected color component array; and
    combining the corrected color component arrays for each of the plurality of color components to form a corrected digital image.

11. A method in accordance with claim 10, further comprising:
    for each received color component array of the plurality of received color component arrays:
        correcting for illumination non-uniformity of the received color component array dependent upon the color of the sensed component to obtain the corrected color component array.

12. A method in accordance with claim 10, further comprising:
    correcting for non-uniform sensitivity of the sensor elements of the luminance sensitive sensor array.

13. A method in accordance with claim 10, wherein correcting for distortion of the received color component array dependent upon the color of the sensed component comprises:
    determining a pixel value in the corrected color component array dependent upon a plurality of pixel values in the received color component array and a geometric model of a distortion introduced by the camera.

14. A method in accordance with claim 13, wherein one or more of the corrected color component arrays is complete.

15. A method in accordance with claim 10, wherein the corrected color component arrays are incomplete and wherein combining the corrected color component arrays for each of the plurality of color components to form a corrected digital image comprises:
    de-interlacing the corrected color component arrays.

16. A method for producing a distortion corrected digital image, the method comprising:
    applying a wavelength specific distortion correction to each color component of the digital image to provide distortion corrected color components, and combining the distortion corrected color components to produce the distortion corrected digital image, wherein the wavelength specific distortion correction is dependent upon the color of that color component and a mathematical model of distortion introduced by a digital camera that captured the digital image.

17. A method in accordance with claim 16, further comprising:

removing pixel elements of the digital image resulting from image sensor pixel leakages prior to applying the wavelength specific distortion correction.

18. A method in accordance with claim 16, further comprising:

applying pixel data interpolation to the digital image prior to applying the wavelength specific distortion correction.

19. A method in accordance with claim 16, further comprising:

correcting for illumination non-uniformity prior to applying the wavelength specific distortion correction.

* * * * *